July 7, 1964  M. BAERMANN  3,140,079
MAGNETIC DRIVE
Original Filed Jan. 31, 1957
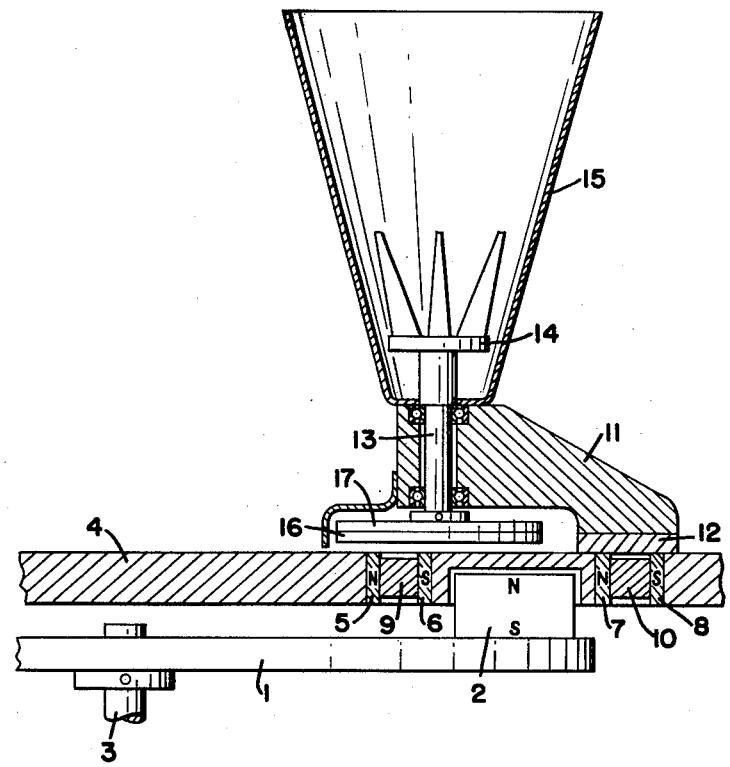
INVENTOR.
MAX BAERMANN
BY
*Alfred C. Body*
ATTORNEY

United States Patent Office 3,140,079
Patented July 7, 1964

3,140,079
MAGNETIC DRIVE
Max Baermann, Bensberg Wolfshof,
Cologne (Rhine), Germany
Continuation of abandoned application Ser. No. 637,494,
Jan. 31, 1957. This application Feb. 18, 1960, Ser.
No. 11,945
6 Claims. (Cl. 259—108)

The present invention relates to a magnetic drive and more particularly to a magnetic drive for a kitchen appliance having a rotary operating mechanism, such as a mixer or blender.

In my United States Letters Patent No. 2,912,552, which is based upon an application that was co-pending with the parent application of the present application, an apparatus for transforming mechanical energy into heat by producing eddy currents or hysteresis effects on pots, pans, or similar bodies, is described. In the preferred embodiment of such apparatus, the pots or pans are adapted to be positioned overlying a cooking top of electrically non-conductive, low permeability material. A plurality of magnets are mounted on a suitable rotary support below the cooking top, such as a motor-driven disc. These magnets present upwardly facing pole tips, with the pole tips of adjacent magnets having alternating or opposite polarity so as to produce magnet fields which extend up through the cooking top. The movement of the magnets beneath the pot or pan causes eddy current or hysteresis effects therein which are effective to cook the food in the pot or pan.

The present invention is directed to a novel magnetic drive which enables the rotating magnet arrangement of my above-mentioned U.S. Patent No. 2,912,552 to be used also for the purpose of driving a kitchen appliance, such as, for example, a mixer, blender, grinder, or the like.

In accordance with the present invention, there is provided a novel magnetic drive which includes a group of magnets arranged in a ring of predetermined diameter and mounted for rotation about a predetermined axis, with adjacent magnets having opposite magnetic polarity, and a disc of electrically conductive material mounted for rotation about an axis which is offset from the rotational axis of the ring of magnets, such disc being of substantially smaller diameter than the diameter of the ring of magnets and being positioned in inductive relationship to a portion of the ring of magnets. With this arrangement, the disc is rotated at a higher angular velocity than the angular velocity of the ring of magnets when the ring of magnets is rotated. Preferably, such disc is mounted on the lower end of the drive shaft of the kitchen appliance, such as a mixer, blender, or grinder.

It is an object of this invention to provide a novel and improved magnetic drive.

It is also an object of this invention to provide such a magnetic drive in which the driven part is rotated at a substantially higher angular velocity than that of the driving part.

Another object of this invention is to provide a novel drive for kitchen appliances which is safe to use, simple in construction, easy to keep clean and positive in operation.

Another object of this invention is to provide a novel magnetic drive for operating kitchen appliances which may include the same rotatable ring of magnets which is used for cooking purposes, as disclosed and claimed in my aforementioned U.S. Patent No. 2,912,552.

Further objects of the invention and a fuller understanding thereof will become apparent from the following description of a specific example, as included herein for purposes of explanation and not of limitation, and when taken in conjunction with the accompanying drawing which illustrates in cross-section a device embodying the features of the invention.

The example of the invention, illustrated in the single figure of the drawing for purposes of description and not of limitation, shows a circular disc-shaped ground body 1 made of ferro-magnetic material and provided with a ring of circumferentially spaced field magnets 2 about the periphery thereof. Preferably, the field magnets 2 are permanent magnets although, if desired, electro magnets may be used in place of permanent magnets. The magnets 2 have vertical axes of magnetization and present upwardly facing pole tips which are of alternating polarity around the ring. That is, successive magnets have opposite polarities.

The body 1 may be the same as, and rotates on or with a shaft 3 in the same manner as, described in my aforementioned U.S. Patent 2,912,552, and thus revolves the permanent magnets 2 in a path of revolution about the axis of shaft 3. The shaft is driven by a suitable electric motor (not shown). Above this ground body 1 is a non-magnetic plate or top 4 in which are inserted radially magnetized permanent magnet hold-down rings 9 and 10. This plate 4 may be a table top, or the like, and the permanent magnet rings 9 and 10 are provided with pole shoes 5, 6, 7 and 8. Resting on top of the table top, or plate 4, which may be the same top as described in my aforementioned patent, is a kitchen device such, for example, as the mixing device illustrated.

This mixing device consists of a base 11 carrying a plate 12 of ferro-magnetic material on its bottom side and rotatably supporting a shaft 13 which has a head 14 positioned in a cup-shaped housing 15. The shaft 13 also has on its lower end, or that end which is closest to the table top 4, or which is closest to the permanent magnets 2, an electrically conductive disc or current-conducting body or member 16. The disc 16 is substantially smaller in diameter than the diameter of the ring of field magnets 2. Disc 16 overlies a portion of the path of movement of the field magnets 2 and is in inductive relationship to the underlying field magnets 2.

In the embodiment illustrated, the shaft 13 is parallel to and spaced laterally from the shaft 3 so that the current-conducting member 16 rotates on an axis which is parallel to and spaced from the axis of revolution of the permanent magnets 2. It is understood that the disc or ground body 16 may be flat and disc-shaped, as illustrated, or it may be of barrel-shape and that the shaft 13 may be positioned at an oblique angle to the shaft 3. For example, the shaft 13 may be positioned parallel with, or at an angle other than perpendicular to the plate 4. In either case, the rotatable current-conducting element 16 is positioned relative to the revolving magnetic field formed by revolving magnets 2 so that a portion of the current-conducting body 16 is always in the revolving magnetic field, but all of the current-conducting body is never within the magnetic field at any one instant of time. When the axis of the member 16 and the axis of revolution of the magnetic field are parallel and spaced apart, the successive portions of the member 16 move tangentially into and out of the magnetic field. In this way, driving action is imparted from the revolving magnetic field to the rotatable member 16 so that it, in turn, may rotate the shaft 13 to drive the kitchen device.

The disc 16 may be covered with a layer 17 of ferromagnetic material on the side thereof furthest away from the revolving magnet wheel or the ground body 1 in order to improve magnetic flux conductivity of the member 16 to increase the efficiency of the device in the manner well known in the magnetic motor art.

To operate the device, the ground body 1 is rotated as described in the co-pending application to revolve the field magnets 2 and thus establish a revolving magnetic field under the table top 4 with the magnetic field extending upwardly through and above the table top. The kitchen device is simply rested on the table top, or plate 4, with the plate 12 of the base 11 in magnetically attracted relation with the pole shoes 5, 6, 7 and 8 of the magnet rings 9 and 10 so that the base 11 is stationarily held relative to the stationary plate or table top 4. The moving or revolving magnetic field thus established by revolving the field magnets react on the body or member 16 and cause it to rotate and thus rotate the shaft 13 to drive the kitchen device. Since, as previously indicated, disc 16 is of substantially smaller diameter than the diameter of the ring of magnets 2 circumferentially spaced about the periphery of circular body 1, the rotational speed of disc 16, in terms of revolutions per specified time period, is substantially higher than the rotational speed of body 1.

It is apparent that such a device is completely safe, is economical to use, and easy to keep clean since the rotating driving member 16 on the shaft 13 may be completely removed from the table top 4. It is further apparent that the same field magnets may be used under the table top 4 for either heating pans or the like as described in my aforementioned patent or for driving kitchen appliances as herein described.

It is appreciated that various modifications and arrangements of parts may be had without departing from the spirit and scope of the invention, such, for example, the variations in the construction of the table top and the ground body 1 and the magnets 2. Other similar modifications and variations in the details of the parts will become apparent to others on a reading and understanding of this specification. It is my intention to include all such modifications and alterations insofar as they come within the scope of the appended claims.

This application is a continuation of my co-pending application Serial No. 637,494, filed January 31, 1957 and now abandoned.

Having thus described my invention, I claim:

1. A household utensil assembly comprising a plurality of spaced magnets arranged in a ring of predetermined diameter and mounted for rotation about a predetermined axis, each of said magnets having an axis of magnetization which is transverse to the plane of said ring and adjacent magnets having opposite magnetic polarity, a disc of electrically conductive material mounted for rotation about an axis which is offset from the rotational axis of said ring of magnets, said disc being of substantially smaller diameter than the diameter of said ring of magnets with a portion of said disc being positioned in inductive relationship to a portion of said ring of magnets whereby said disc is rotated at a higher angular velocity than that of said ring of magnets when said ring of magnets is rotated, and a household utensil member coupled to said disc to be driven thereby.

2. A magnetic drive comprising a plurality of spaced magnets arranged in a ring of predetermined diameter and mounted for rotation about a predetermined axis, each of said magnets having an axis of magnetization which is transverse to the plane of said ring and adjacent magnets having opposite magnetic polarity, a disc of electrically conductive material mounted for rotation about an axis which is offset from the rotational axis of said ring of magnets, said disc being of substantially smaller diameter than the diameter of said ring of magnets and positioned with a portion of said disc in inductive relationship to a portion of said ring of magnets whereby said disc is rotated at a higher angular velocity than that of said ring of magnets when said ring of magnets is rotated, and a rotary member coupled to said disc to be driven thereby.

3. In a household appliance, the combination of a horizontal support of non-magnetic material, a first disc rotatable on a vertical axis below said support, a plurality of permanent magnets arranged in a ring of predetermined diameter and in circumferentially spaced relationship on said first disc, each of said magnets having a vertical axis of magnetization and adjacent magnets having opposite magnetic polarity, a base member resting on said support, a vertical shaft rotatably mounted on said base, and a second disc of electrically conductive material mounted on the lower end of said shaft with a portion of said second disc in inductive relationship to certain of said magnets, said second disc having a diameter appreciably less than the diameter of said ring of magnets, and said shaft having its rotational axis offset from the rotational axis of said ring of magnets.

4. In a household mixing device comprised of a container having a base, a rotatable shaft extending vertically through said base, an electrically conducting disc mounted on the lower end of said shaft and rotatable therewith on a vertical axis, a horizontal support for said base with said disc being closely spaced adjacent thereto, the improvement which comprises: a member in close spaced relationship below said support and rotatable on a vertical axis, power means for rotating said member, a plurality of permanent magnets arranged in spaced relationship on said member in a circle coaxial with the axis of rotation, said magnets having upwardly facing poles with adjacent magnets having opposite magnetic polarity, the diameter of the circle of said magnets being greater than the diameter of said disc and the axes of rotation of said disc and member being radially offset so that only a portion of the periphery of the disc at any one time is located only above a portion of said magnets, the flux of said magnets threading through said support into said disc whereby eddy currents are induced therein causing said disc to rotate at a speed greater than said member.

5. The combination of claim 4 wherein said support has a plurality of permanent magnets offset laterally from the upwardly extended path of movement of said first mentioned permanent magnet and at least the bottom portion of said base is of magnetically permeable material.

6. The combination of claim 4 wherein at least a portion of said disc is of magnetically permeable material.

References Cited in the file of this patent

UNITED STATES PATENTS

| | | |
|---|---|---|
| 1,420,773 | Stainbrook | June 27, 1922 |
| 1,960,324 | Van Deventer et al. | May 29, 1934 |
| 2,408,163 | Fador | Sept. 24, 1946 |
| 2,481,172 | Staggs | Sept. 6, 1949 |
| 2,546,949 | Morrison | Mar. 27, 1951 |
| 2,641,212 | Meilstrup | June 9, 1953 |
| 2,655,011 | Ihle et al. | Oct. 13, 1953 |

FOREIGN PATENTS

| | | |
|---|---|---|
| 8,815 | Great Britain | of 1895 |
| 531,130 | Belgium | Aug. 31, 1954 |